United States Patent
Yamashita

(10) Patent No.: US 10,711,939 B2
(45) Date of Patent: Jul. 14, 2020

(54) DECOMPRESSION HEAT-INSULATING PIPE STRUCTURE

(71) Applicant: TOYOTA JIDOSHA KABUSHIKI KAISHA, Toyota-shi (JP)

(72) Inventor: Osamu Yamashita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 49 days.

(21) Appl. No.: 15/862,663

(22) Filed: Jan. 5, 2018

(65) Prior Publication Data
US 2018/0224053 A1 Aug. 9, 2018

(30) Foreign Application Priority Data

Feb. 8, 2017 (JP) .................................. 2017-021632

(51) Int. Cl.
*F16L 59/065* (2006.01)
*F16L 59/14* (2006.01)
(Continued)

(52) U.S. Cl.
CPC ........ *F16L 59/065* (2013.01); *B65D 81/3841* (2013.01); *C21D 9/0006* (2013.01); *F16L 9/18* (2013.01); *F16L 23/22* (2013.01); *F16L 27/107* (2013.01); *F16L 27/11* (2013.01); *F16L 51/00* (2013.01); *F16L 51/025* (2013.01); *F16L 59/14* (2013.01); *F16L 59/143* (2013.01);
(Continued)

(58) Field of Classification Search
CPC . F16L 59/065; F16L 59/14; F16L 9/18; F16L 23/22; F16L 39/04

USPC ......................................................... 138/148
See application file for complete search history.

(56) References Cited

U.S. PATENT DOCUMENTS 3,964,754 A * 6/1976 Murai ....................... F16L 7/02
277/621
4,029,344 A * 6/1977 Stone ...................... E04F 17/02
285/47

(Continued)

FOREIGN PATENT DOCUMENTS

JP           9-83089 A      3/1997
JP          10-231970 A    9/1998
(Continued)

*Primary Examiner* — Craig M Schneider
*Assistant Examiner* — David R Deal
(74) *Attorney, Agent, or Firm* — Oblon, McClelland, Maier & Neustadt, L.L.P.

(57) ABSTRACT

A decompression heat-insulating pipe structure that can exhibit the desired heat-insulating performance and is easy to assemble. In the structure, a space between ends of inner and outer tubes is decompressed. The outer tube includes a first flange, which extends radially inward from an axially one end thereof, and a second flange, which extends radially outward from the axially other end thereof. The inner tube includes a third flange, which extends radially inward from an axially one end thereof and is opposed to the first flange at an axially inward position of the first flange, and a fourth flange, which extends radially outward from the axially other end thereof and being opposed to the second flange at an axially outward position of the second flange. First and second elastic seal members are disposed between the first and third flanges and between the second and fourth flanges, respectively.

2 Claims, 10 Drawing Sheets

(51) Int. Cl.
*F16L 9/18* (2006.01)
*F16L 23/22* (2006.01)
*F16L 27/107* (2006.01)
*F16L 27/11* (2006.01)
*F16L 51/00* (2006.01)
*C21D 9/00* (2006.01)
*F16L 51/02* (2006.01)
*B65D 81/38* (2006.01)
*F27D 3/00* (2006.01)
*F27D 99/00* (2010.01)
*F27D 3/18* (2006.01)
*F16L 39/04* (2006.01)
*C21D 1/773* (2006.01)

(52) U.S. Cl.
CPC ......... *F27D 3/0025* (2013.01); *F27D 3/0033* (2013.01); *F27D 3/18* (2013.01); *F27D 99/0073* (2013.01); *C21D 1/773* (2013.01); *F16L 39/04* (2013.01)

(56) References Cited

U.S. PATENT DOCUMENTS

| | | | |
|---|---|---|---|
| 4,475,341 A * | 10/1984 | Inoue | F01N 13/10 138/148 |
| 4,534,923 A * | 8/1985 | Lupke | B26F 1/0069 264/156 |
| 5,163,416 A | 11/1992 | Schultz et al. | |
| 6,354,632 B1 * | 3/2002 | Jung | F01N 13/1811 285/49 |
| 6,419,280 B2 * | 7/2002 | Uegane | F01N 13/1816 285/299 |
| 6,901,955 B2 * | 6/2005 | Valentian | F02K 9/343 137/580 |
| 6,910,506 B2 * | 6/2005 | Gabriel | F01N 13/08 138/109 |
| 2006/0067860 A1 * | 3/2006 | Faircloth, Jr. | F01N 3/0211 422/171 |
| 2008/0169037 A1 * | 7/2008 | Ziegler | F16L 39/005 138/149 |
| 2009/0284006 A1 * | 11/2009 | Chahine | F01N 13/1811 285/229 |
| 2011/0233923 A1 * | 9/2011 | Kouketsu | F16L 39/005 285/123.3 |
| 2014/0339815 A1 * | 11/2014 | Johnson | F16L 51/00 285/226 |
| 2017/0108244 A1 | 4/2017 | Matsudo | |
| 2018/0231170 A1 | 8/2018 | Yamashita | |

FOREIGN PATENT DOCUMENTS

| | | |
|---|---|---|
| JP | 2003-314785 A | 11/2003 |
| JP | 2016-80053 A | 5/2016 |
| JP | 2018-132119 A | 8/2018 |
| WO | WO 2015/151774 A1 | 10/2015 |

\* cited by examiner

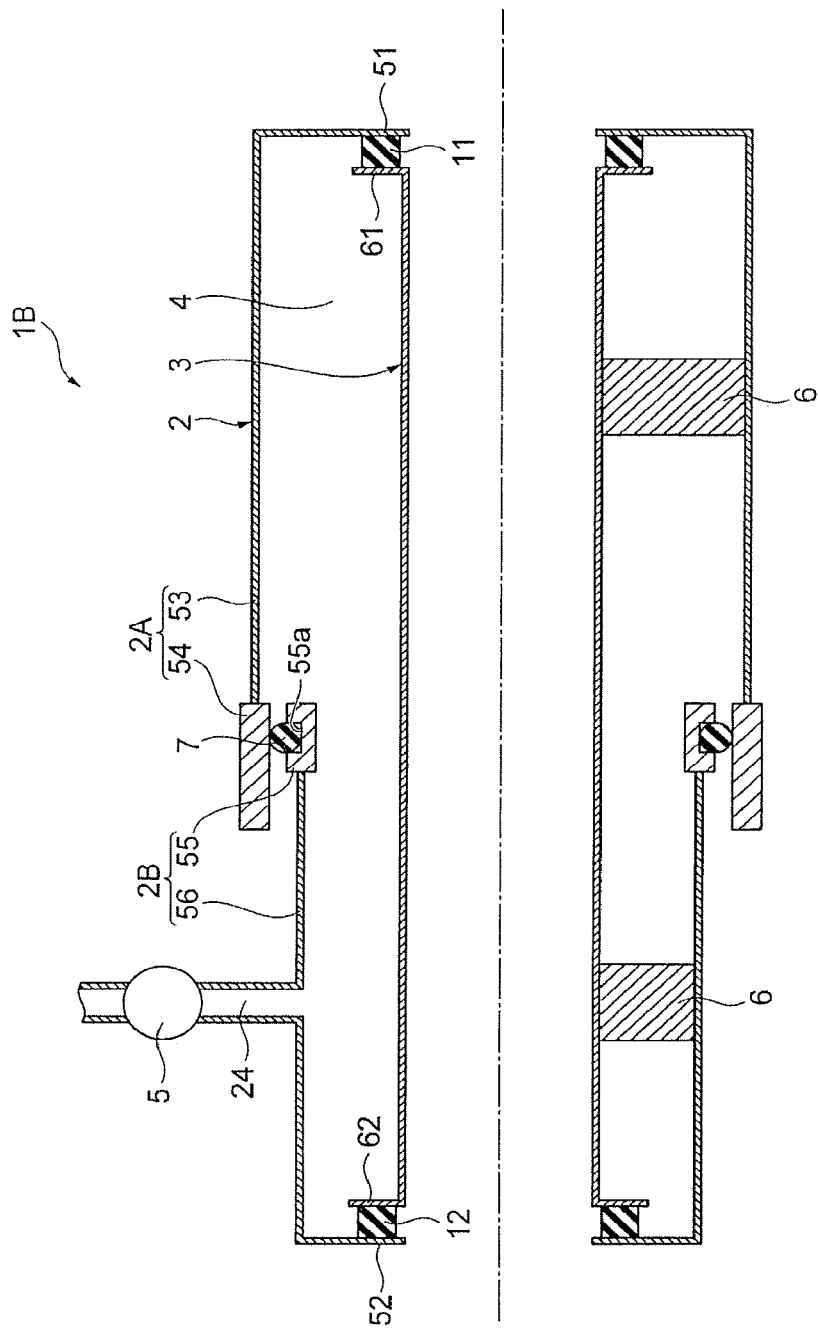

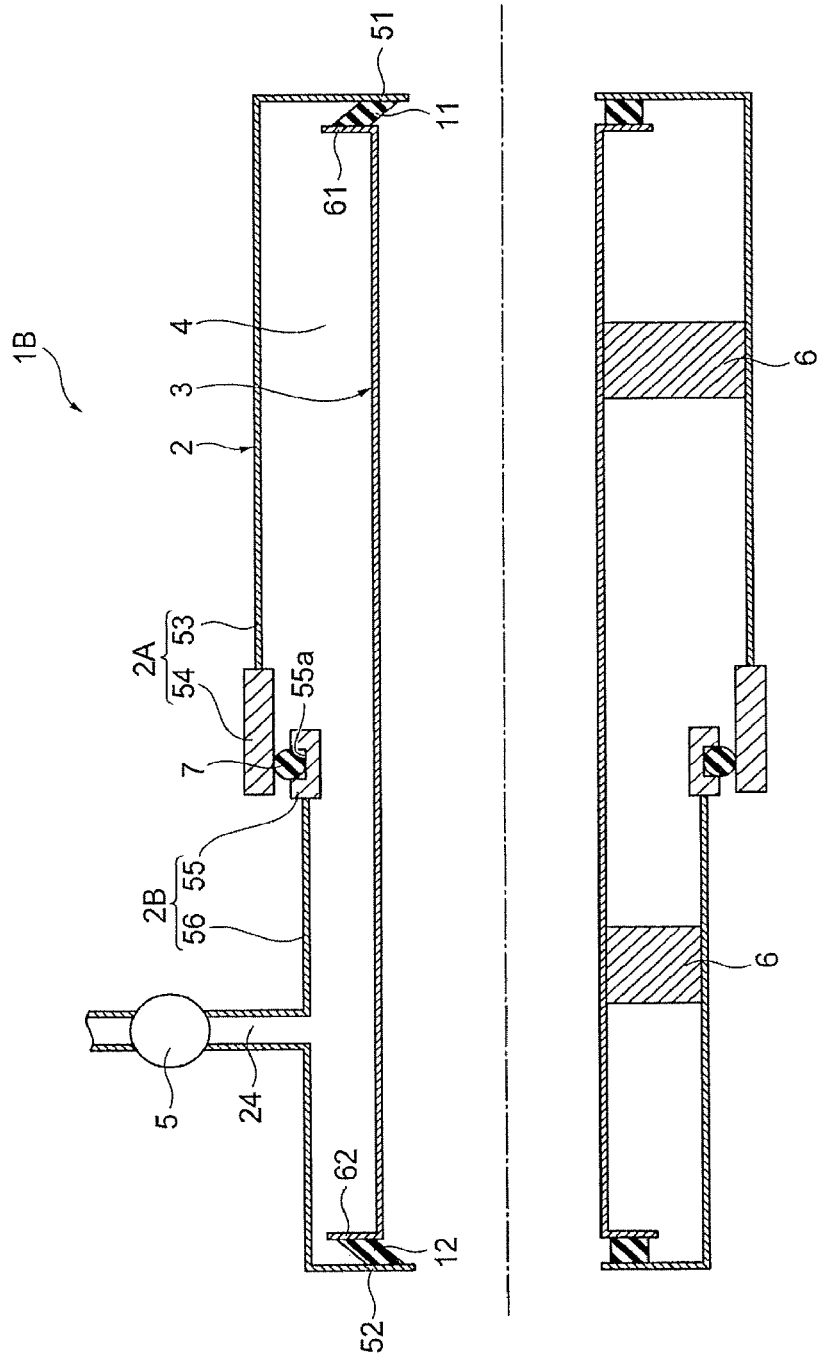

DECOMPRESSION HEAT-INSULATING PIPE STRUCTURE

CROSS REFERENCE TO RELATED APPLICATIONS

The present application claims priority from Japanese patent application JP 2017-021632 filed on Feb. 8, 2017, the content of which is hereby incorporated by reference into this application.

BACKGROUND

Technical Field

The present disclosure relates to a decompression heat-insulating pipe structure in which a space between an inner tube and an outer tube is decompressed.

Background Art

Conventionally, there has been known a technique of a decompression heat-insulating pipe structure in which a space between ends of an outer tube and an inner tube is sealed with an elastic rubber member for decompressing the space between the inner tube and the outer tube (see JP 2003-314785 A).

SUMMARY

However, when the technique disclosed in JP 2003-314785 A is used, if the dimensional accuracy in the radial direction of the inner tube and the outer tube is low, there may be adverse effect on the heat-insulating performance and the assembly performance. For example, when each of the inner tube and the outer tube is formed by deforming a flat plate member into a tubular shape, the dimensional accuracy in the radial direction tends to be lower than that in the axial direction. When the radial dimension of the inner tube is smaller than the standard dimension, the distance between the inner tube and the outer tube becomes large. Therefore, in such a case, the space between the inner tube and the outer tube is difficult to be sealed with an elastic seal member, such as rubber, and therefore is difficult to be decompressed, and so the desired heat-insulating performance may not be exhibited. Meanwhile, when the radial dimension of the inner tube is larger than the standard dimension, for example, the distance between the inner tube and the outer tube becomes narrow. Therefore, in such a case, an elastic seal member is difficult to be disposed in a space between the inner tube and the outer tube, and so the assembly performance may deteriorate.

The present disclosure has been made in view of the foregoing, and exemplary embodiments relate to providing a decompression heat-insulating pipe structure that can exhibit the desired heat-insulating performance and is easy to assemble.

Accordingly, a decompression heat-insulating pipe structure of the present disclosure includes an inner tube, an outer tube, and an elastic seal member disposed between ends of the inner tube and the outer tube to seal a space between the inner tube and the outer tube so that the space is decompressed, in which the outer tube includes a first flange and a second flange, the first flange extending radially inward from an axially one end of the outer tube, and the second flange extending radially outward from the axially other end of the outer tube; the inner tube includes a third flange and a fourth flange, the third flange extending radially inward from an axially one end of the inner tube and being opposed to the first flange at an axially inward position of the first flange, and the fourth flange extending radially outward from the axially other end of the inner tube and being opposed to the second flange at an axially outward position of the second flange; and the elastic seal member includes a first elastic seal member and a second elastic seal member, the first elastic seal member being disposed between the first flange and the third flange, and the second elastic seal member being disposed between the second flange and the fourth flange.

According to the present disclosure, when the space between the inner tube and the outer tube is decompressed, the inner tube and the outer tube are caused to relatively approach each other, and so the first elastic seal member is compressed between the first flange and the third flange, and the second elastic seal member is compressed between the second flange and the fourth flange. Since the first elastic seal member and the second elastic seal member are compressed in the axial direction in which the dimensional accuracy of the inner tube and the outer tube is relatively high, a high sealing property can be obtained even when the dimensional accuracy in the radial direction of the inner tube and the outer tube is not high. Therefore, the space between the inner tube and the outer tube can be decompressed reliably and high heat-insulating performance can be obtained. In addition, only through insertion of the inner tube into the outer tube, the first elastic seal member and the second elastic seal member can be disposed reliably between the first flange and the third flange and between the second flange and the fourth flange, respectively, so as to be sandwiched therebetween, and so high assembly performance can be provided.

In the decompression heat-insulating pipe structure of the present disclosure, at least one of the inner tube or the outer tube preferably includes bellows, the bellows being configured to elongate or contract axially.

According to the present disclosure, when the axial dimension of at least one of the inner tube or the outer tube changes due to thermal expansion or thermal shrinkage, for example, not only are the first elastic seal member and the second elastic seal member elastically deformed, but also the bellows elongate or contract. Therefore, the changed dimension can be absorbed and the sealed state with the first elastic seal member and the second elastic seal member can be kept.

A decompression heat-insulating pipe structure of the present disclosure includes an inner tube and an outer tube, a space between the inner tube and the outer tube being adapted to be decompressed, in which the outer tube includes a first outer tube, a second outer tube, and an O-ring disposed between the first outer tube and the second outer tube, the first outer tube being disposed at an axially one end of the outer tube, the second outer tube being disposed at the axially other end of the outer tube and adapted to be fitted to the first outer tube, and the O-ring being adapted to seal a space between the first outer tube and the second outer tube and support the first outer tube and the second outer tube such that the first outer tube and the second outer tube are slidable with respect to each other in an axial direction; the first outer tube includes a first flange extending radially from an axially one end thereof; the second outer tube includes a second flange extending radially from an axially one end thereof; the inner tube includes a third flange and a fourth flange, the third flange extending radially from an axially one end of the inner tube and being opposed to the first flange at an axially inward position of the first flange, and the fourth flange extending radially from the axially other end of the inner tube and being opposed to the second flange at an axially inward position of the second flange; a first elastic seal member is provided between the first flange and the third flange so as to seal a space between the first flange and the third flange; and a second elastic seal member is provided between the second flange and the fourth flange so as to seal a space between the second flange and the fourth flange.

According to the present disclosure, when the space between the inner tube and the outer tube is decompressed, the inner tube and the outer tube are caused to relatively approach each other, and so the first elastic seal member is compressed between the first flange and the third flange, and the second elastic seal member is compressed between the second flange and the fourth flange. Since the first elastic seal member and the second elastic seal member are compressed in the axial direction in which the dimensional accuracy of the inner tube and the outer tube is relatively high, a high sealing property can be obtained. Therefore, the space between the inner tube and the outer tube can be decompressed reliably and high heat-insulating performance can be obtained. In addition, when the axial dimension of the inner tube changes due to thermal expansion or thermal shrinkage, for example, the first outer tube and the second outer tube slide with respect to each other in the axial direction. Therefore, the changed dimension can be absorbed and the sealed state with the first elastic seal member and the second elastic seal member can be can be kept.

In the decompression heat-insulating pipe structure of the present disclosure, the first outer tube includes a first long-tube portion and a first short-tube portion, the first long-tube portion being disposed at an axially one end of the first outer tube, and the first short-tube portion being provided at an axially one end of the first long-tube portion and having higher dimensional accuracy in a radial direction than the first long-tube portion; the second outer tube includes a second long-tube portion and a second short-tube portion, the second long-tube portion being disposed at the axial other end of the second outer tube, and the second short-tube portion being disposed at an axially one end of the second long-tube portion and having higher dimensional accuracy in the radial direction than the second long-tube portion; and the O-ring is preferably disposed between the first short-tube portion and the second short-tube portion.

According to the present disclosure, since the O-ring is disposed between the first short-tube portion and the second short-tube portion, which have higher dimensional accuracy in the radial direction than the first long-tube portion and the second long-tube portion, a space between the first outer tube and the second outer tube can be sealed reliably.

In the decompression heat-insulating pipe structure of the present disclosure, the first short-tube portion and the second short-tube portion are preferably disposed at an axially central position of the outer tube.

According to the present disclosure, the first short-tube portion and the second short-tube portion are disposed at the axially central position of the outer tube that is as far as possible from the axially opposite ends of the outer tube to which heat from the inner tube is easily transferred. Therefore, a temperature rise of the first short-tube portion, the second short-tube portion, and the O-ring can be suppressed, and so deformation thereof due to thermal expansion can be suppressed. Therefore, the sealing property between the first outer tube and the second outer tube can be kept high.

According to the present disclosure, a decompression heat-insulating pipe structure that can exhibit the desired heat-insulating performance and is easy to assemble can be provided.

BRIEF DESCRIPTION OF THE DRAWINGS

FIG. 4A is a cross-sectional view showing a state before the internal space of an inner tube of a decompression heat-insulating pipe structure in accordance with a second embodiment is heated;

FIG. 4B is a cross-sectional view showing a state in which the internal space of the inner tube of the decompression heat-insulating pipe structure in accordance with the second embodiment is heated;

DETAILED DESCRIPTION

First Embodiment

Next, a first embodiment of the present disclosure will be described in detail with reference to the drawings.

Figure 1:
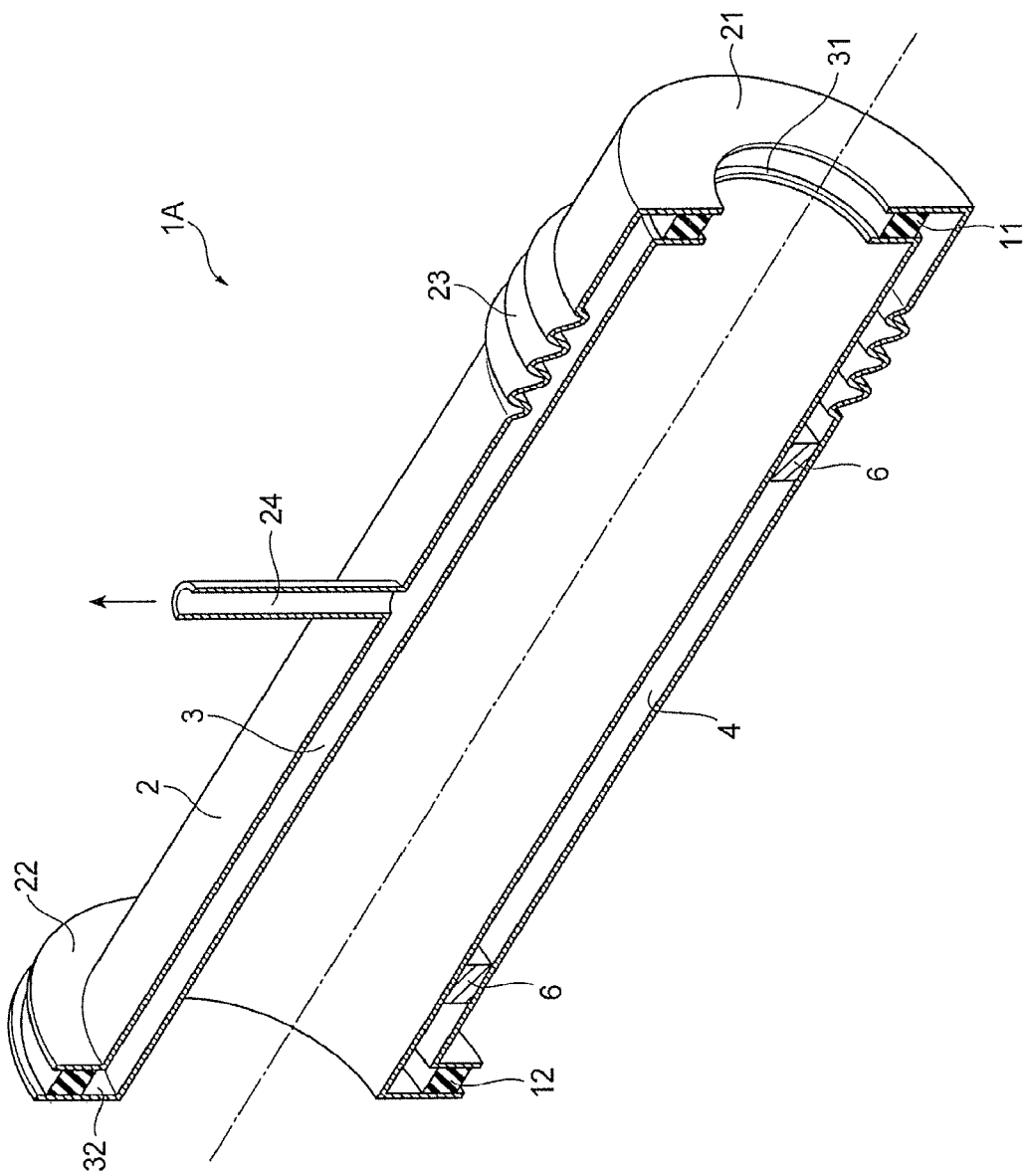
FIG. 1 is a perspective cross-sectional view of a decompression heat-insulating pipe structure in accordance with a first embodiment.

FIG. 1 is a perspective cross-sectional view of a decompression heat-insulating pipe structure in accordance with the first embodiment.

A decompression heat-insulating pipe structure 1A has a double-tube structure including an outer tube 2 and an inner tube 3 inserted into the outer tube 2. A space between axially one end of the outer tube 2 and axially one end of the inner tube 3 is sealed with a first elastic seal member 11, while a space between the axially other end of the outer tube 2 and the axially other end of the inner tube 3 is sealed with a second elastic seal member 12.

Figure 2:
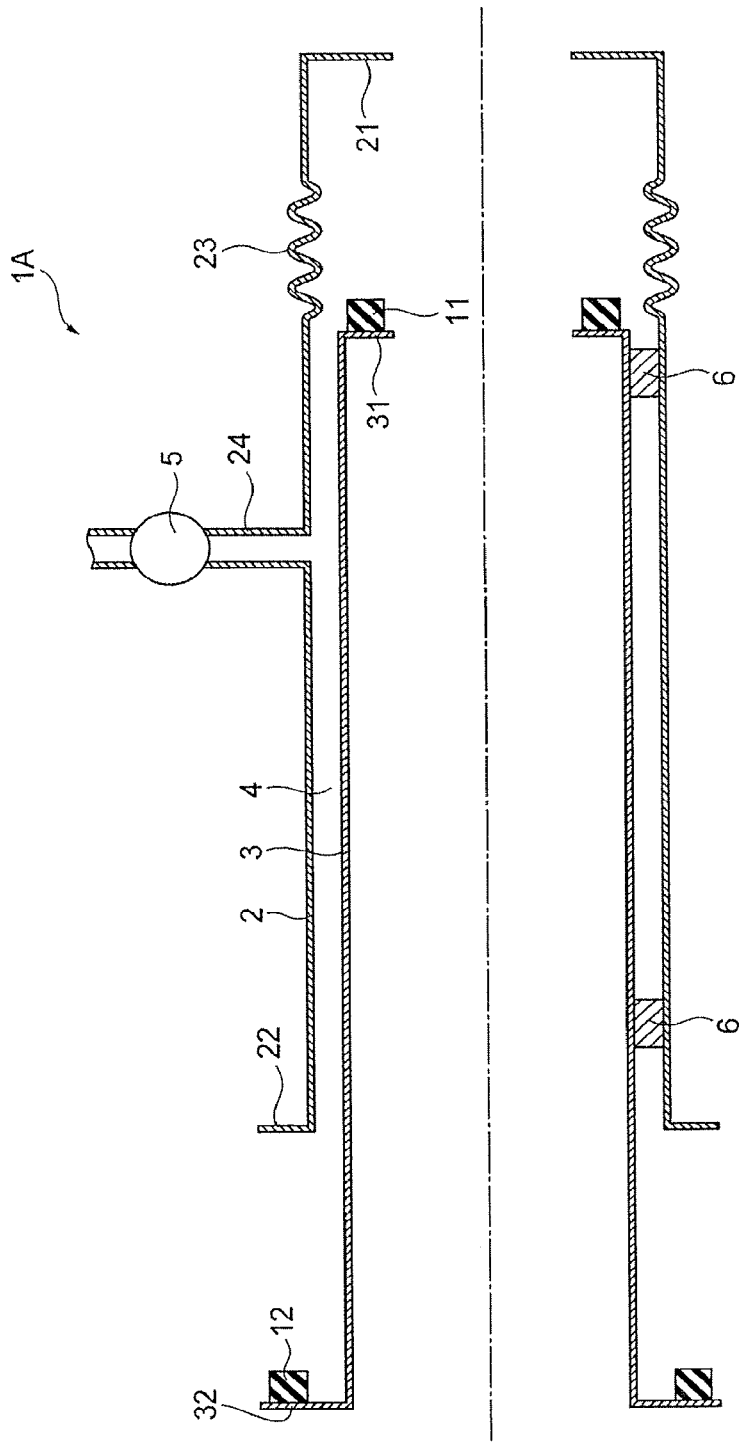
FIG. 2 is a view illustrating a method for assembling the decompression heat-insulating pipe structure in accordance with the first embodiment.

The outer tube 2 connects with an exhaust channel 24 leading to a vacuum pump 5 (see FIG. 2). Air between the outer tube 2 and the inner tube 3 is exhausted through the exhaust channel 24 so that a space 4 between the outer tube 2 and the inner tube 3 can be decompressed. Such decompressed space 4 between the outer tube 2 and the inner tube 3 of the decompression heat-insulating pipe structure 1A leads to heat insulation between the external part of the outer tube 2 and the internal space surrounded with the inner tube 3.

The outer tube 2 has a cylindrical tubular shape having a constant diameter and extending in the axial direction. The outer tube 2 is formed by bending an iron plate, which is a metal flat plate member with a constant thickness, using a working machine, such as a roll bender, and deforming the plate into a tubular shape.

The dimensional accuracy in the axial direction of the outer tube 2 is determined by the accuracy of cutting work for cutting an iron plate. Cutting of iron plates is typically conducted with a laser. Therefore, the cutting accuracy is high and the dimensional accuracy in the axial direction of the outer tube 2 is high. Meanwhile, the dimensional accuracy in the radial direction is determined by a method of machining a flat plate member into a tubular shape. Machining of flat plate members into tubular shapes is typically conducted with a roll bender. Therefore, the dimensional accuracy in the radial direction of the outer tube 2 formed through bending is lower than that of a tube formed through mechanical machining, such as cutting work. However, such a tube can be formed easily and inexpensively.

The outer tube 2 has a first flange 21 extending radially inward at its axially one end, and has a second flange 21 extending radially outward at its axially other end. The first flange 21 and the second flange 22 have been formed by cutting iron plates into circular shapes and are joined to the respective opposite ends of the outer tube 2 by welding.

The outer tube 2 includes a bellows 23 that can elongate or contract axially due to elastic deformation. The bellows 23 is integrally formed with the outer tube 2. More specifically, the bellows is formed at a position between axially one end and the axially other end of the outer tube 2, and has a large-diameter part and a small-diameter part that are alternately and continuously formed. The bellows 23 may be formed by providing elongated recesses and elongated protrusions on an iron plate in advance and then deforming the iron plate into a tubular shape. Alternatively, the bellows 23 may be formed at the same time as when an iron plate is deformed into a tubular shape using a working machine.

The bellows 23 is elastically deformed in the direction of increasing or decreasing the distance between the large-diameter part and the small-diameter part, whereby the outer tube 2 can elongate and contract axially. Therefore, when a force in the direction of axially elongating the outer tube 2 acts on the outer tube 2, the outer tube 2 can be elongated axially, while when a force in the direction of axially contracting the outer tube 2 acts on the outer tube 2, the outer tube 2 can be contracted axially.

The inner tube 3 has a cylindrical tubular shape having a constant diameter and extending in the axial direction. The diameter of the inner tube 3 is smaller than that of the outer tube 2 and is large enough to form a predetermined space between the inner tube 3 and the outer tube 2 in a state in which the inner tube 3 is inserted in the outer tube 2. The inner tube 3 is formed by bending an iron plate using a working machine, such as a roll bender, and deforming the plate into a tubular shape, as with the outer tube 2. Therefore, the dimensional accuracy in the radial direction of the inner tube 3 is lower than that of a tube formed through mechanical machining. However, such a tube can be formed easily and inexpensively.

The inner tube 3 has a third flange 31 extending radially inward at its axially one end, and has a fourth flange 32 extending radially outward at its axially other end. The third flange 31 and the fourth flange 32 have been formed by cutting iron plates into circular shapes and are joined to the respective opposite ends of the inner tube 3 by welding.

A supporting base 6 is provided between the outer tube 2 and the inner tube 3. The supporting base 6 is disposed inside of the outer tube 2 and supports the inner tube 3. In this embodiment, the outer tube 2 and the inner tube 3 are arranged sideways so that their axial directions become horizontal. Therefore, the supporting base 6 is disposed between the outer tube 2 and the inner tube 3 to be at the lowermost position. The supporting base 6 is made of a material with low heat conductivity, such as ceramic. The supporting base 6 is adapted to receive the weight of the inner tube 3 itself and the weight of components attached to the internal space of the inner tube 3 for supporting. The supporting base 6 is provided when the first seal member 11 and the second seal member 12 cannot support the weight of them.

Each of the first elastic seal member 11 and the second elastic seal member 12 is formed using an elastic material with high heat resistance, such as silicone rubber. The first elastic seal member 11 has an annular shape and is disposed between the first flange 21 and the third flange 31 so as to be sandwiched from axially opposite sides for sealing between the first flange 21 and the third flange 31. The second elastic seal member 12 also has an annular shape and is disposed between the second flange 22 and the fourth flange 32 so as to be sandwiched from axially opposite sides for sealing between the second flange 22 and the fourth flange 32.

FIG. 2 is a view illustrating a method for assembling the decompression heat-insulating pipe structure in accordance with the first embodiment. The decompression heat-insulating pipe structure 1A is assembled by inserting the inner tube 3 into the outer tube 2 as shown in FIG. 2. The inner tube 3 is inserted at the third flange 31 side, which is axially one end, of the inner tube 3, into the second flange 22 side, which is the axially other end, of the outer tube 2.

The first elastic seal member 11 and the second elastic seal member 12 are fixed by being bonded in advance to the third flange 31 and the fourth flange 32, respectively, of the inner tube 3. When the inner tube 3 is inserted into the outer tube 2, the first elastic seal member 11 and the second elastic seal member 12 are caused to abut the first flange 21 and the second flange 22, respectively, of the outer tube 2 to be securely bonded thereto. Therefore, an assembled state is obtained in which the first elastic seal member 11 is disposed between the first flange 21 and the third flange 31 so as to be sandwiched from axially opposite sides, and the second elastic seal member 12 is disposed between the second flange 22 and the fourth flange 32 so as to be sandwiched from axially opposite sides.

The decompression heat-insulating pipe structure 1A can be assembled by inserting the inner tube 3 into the outer tube 2 even when the dimensional accuracy in the radial direction of the inner tube 3 and the outer tube 2 is not high, and therefore, the first elastic seal member 11 and the second elastic seal member 12 can be disposed reliably between the first flange 21 and the third flange 31 and between the second flange 22 and the fourth flange 32, respectively, so as to be sandwiched therebetween. The decompression heat-insulating pipe structure 1A can be easily assembled without the need for welding when assembled. Therefore, high assembling performance can be obtained.

Figure 3A:
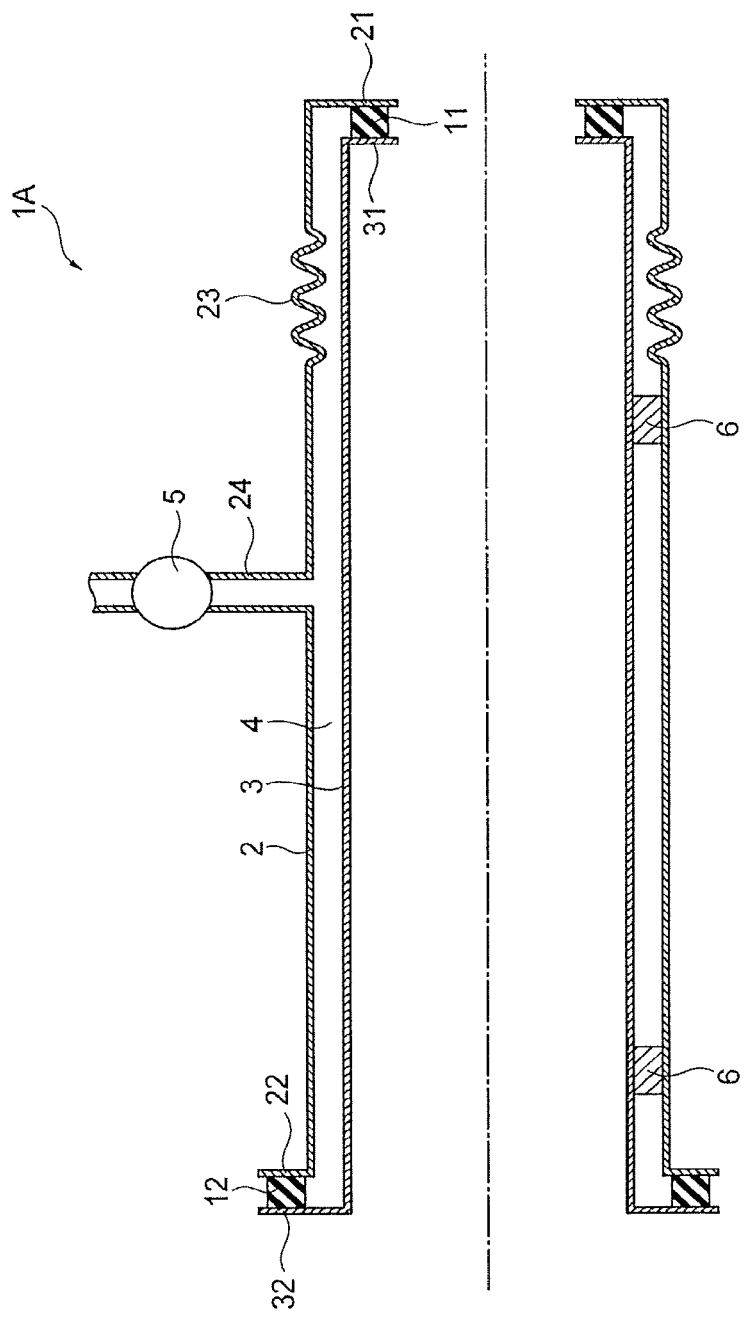
FIG. 3A is a cross-sectional view showing a state before the internal space of an inner tube of the decompression heat-insulating pipe structure in accordance with the first embodiment is heated.
Figure 3B:
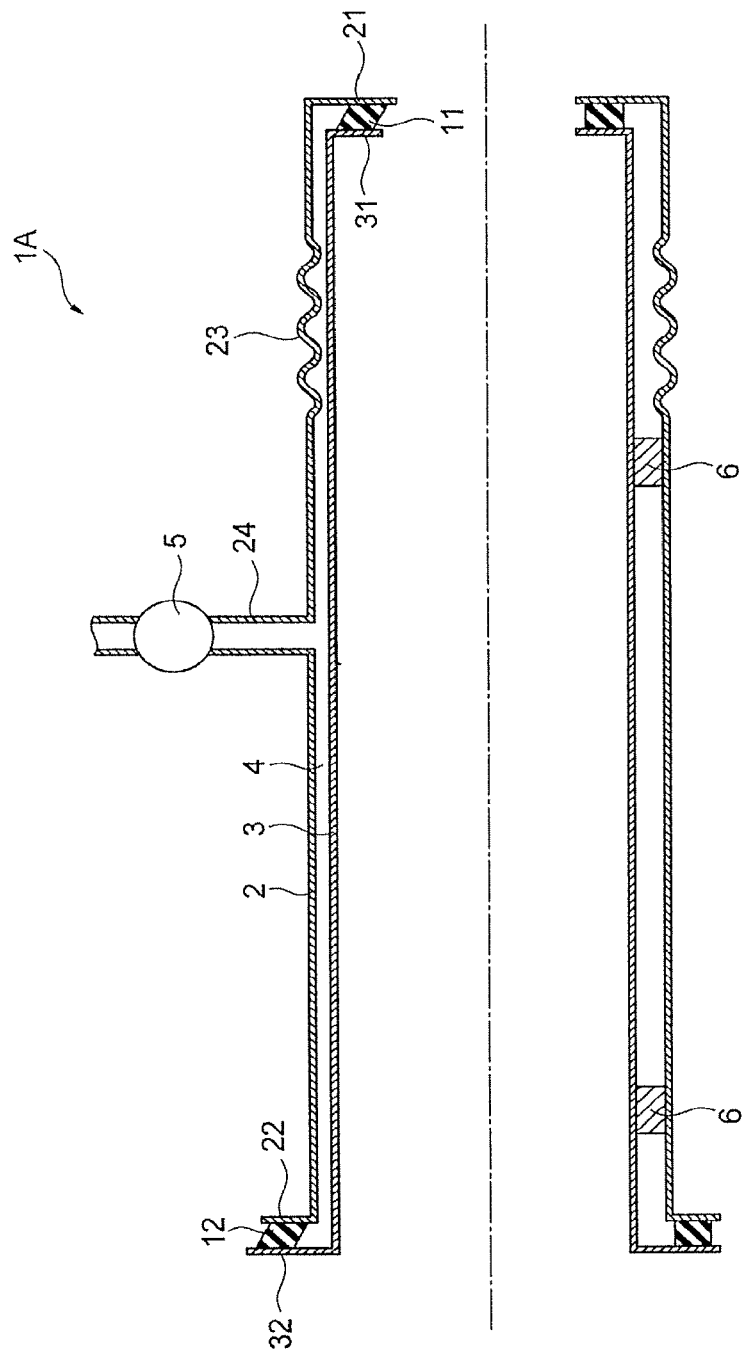
FIG. 3B is a cross-sectional view showing a state in which the internal space of the inner tube of the decompression heat-insulating pipe structure in accordance with the first embodiment is heated.

FIG. 3A is a cross-sectional view showing a state before the internal space of the inner tube of the decompression heat-insulating pipe structure in accordance with the first embodiment is heated. FIG. 3B is a cross-sectional view showing a state in which the internal space of the inner tube of the decompression heat-insulating pipe structure in accordance with the first embodiment is heated.

The decompression heat-insulating pipe structure 1A is used for a system of a heating furnace, for example, in which a workpiece is passed through the internal space of the inner tube 3 kept in a high-temperature state so as to be heated. In the decompression heat-insulating pipe structure 1A, the internal space of the inner tube 3 is heated in a state in which the space 4 between the outer tube 2 and the inner tube 3 is decompressed.

In the decompression heat-insulating pipe structure 1A, as shown in FIG. 3A, the third flange 31 of the inner tube 3 is opposed to the first flange 21 of the outer tube 2 at an axially inward position of the first flange 21, and the fourth flange 32 of the inner tube 3 is opposed to the second flange 22 of the outer tube 2 at an axially outward position of the second flange 22. Therefore, when the space 4 is decompressed, the outer tube 2 and the inner tube 3 are urged in the directions of relatively approaching each other so that the first elastic seal member 11 is compressed between the first flange 21 and the third flange 31, and the second elastic seal member 12 is compressed between the second flange 22 and the fourth flange 32. Therefore, the adhesion of the first elastic seal member 11 and the second elastic seal member 12 can be increased, from which a self-sealing property can be obtained.

When the internal space is heated, the radial and axial dimensions of the inner tube 3 increase due to thermal expansion (see FIG. 3B). Regarding the increase in the radial dimension of the inner tube 3, the dimensional difference generated between the outer tube 2 and the inner tube 3 can be absorbed since the first elastic seal member 11 and the second elastic seal member 12 elastically deform in the shear direction. Likewise, regarding the increase in the axial dimension of the inner tube 3, the dimensional difference generated between the outer tube 2 and the inner tube 3 can be absorbed since the first elastic seal member 11 and the second elastic seal member 12 elastically deform.

In this embodiment, the outer tube 2 includes the bellows 23, and so the outer tube 2 is allowed to elongate or contract axially with the elastic deformation of the bellows 23. Therefore, when the axial dimension of the inner tube 3 is increased due to thermal expansion but the increased dimension cannot be absorbed by the elastic deformation of the first elastic seal member 11 or the second elastic seal member 12, the bellows 23 can absorb such increased dimension due to elastic deformation.

Accordingly, for example, even when the inner tube 3 is axially long or thermally expands more because the inner tube 3 is heated to a high temperature and the temperature rises significantly, no gap is generated between the first elastic seal member 11 and the first flange 21 or the third flange 31 or between the second elastic seal member 12 and the second flange 22 or the fourth flange 32, and so the appropriate sealed state with the first elastic seal member 11 and the second elastic seal member 12 can be kept.

Although the present embodiment describes the example of the outer tube 2 including the bellows 23, the inner tube 3 may include the bellows. Alternatively, the bellows 23 may be omitted when a change in the axial dimension of the inner tube 3 due to thermal expansion is absorbed only by the elastic deformation of the first elastic seal member 11 and the second elastic seal member 12.

Since the decompression heat-insulating pipe structure 1A has a configuration in which the first elastic seal member 11 and the second elastic seal member 12 are sandwiched in the axial direction in which the dimensional accuracy is high, sealed portions can be formed with high accuracy. Therefore, the sealing between the outer tube 2 and the inner tube 3 can be kept and the space can be decompressed reliably, and so high heat-insulating performance can be obtained.

Figure 7:
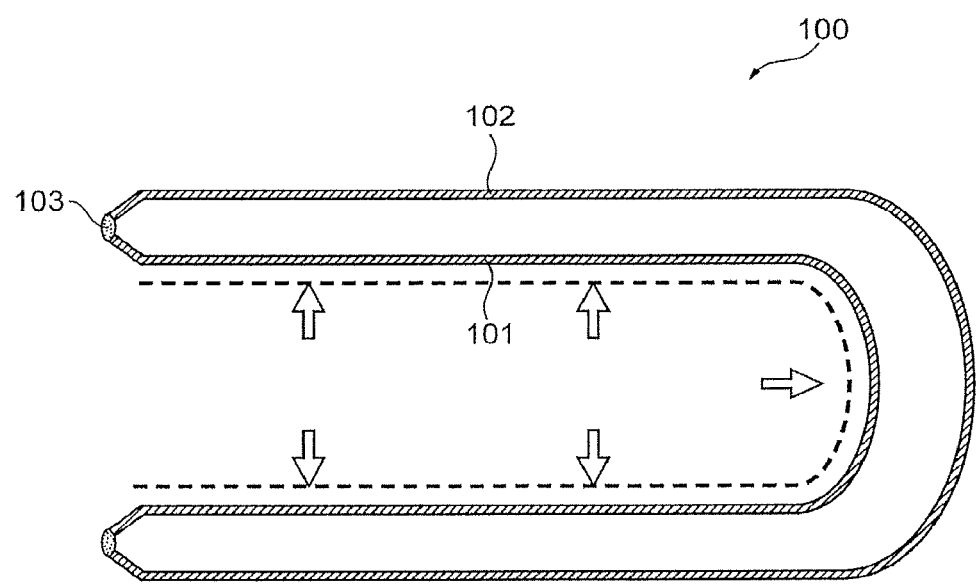
FIG. 7 is a cross-sectional view of the conventional decompression heat-insulating pipe structure.
Figure 8:
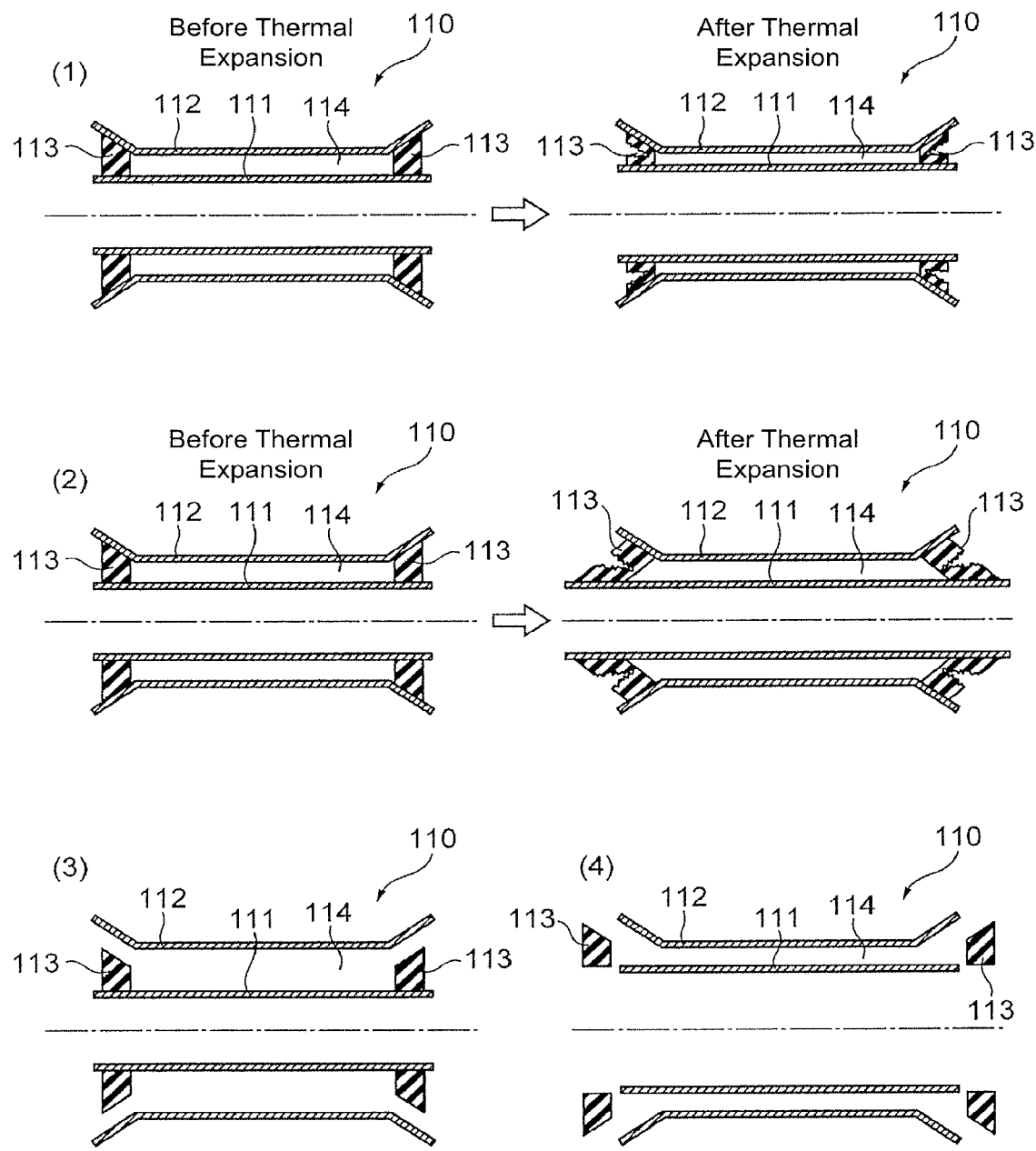
FIG. 8 are views showing a method for sealing the conventional decompression heat-insulating pipe structure and problems associated therewith.

FIG. 7 is a cross-sectional view of the conventional decompression heat-insulating pipe structure, and FIG. 8 are views showing a method for sealing the conventional decompression heat-insulating pipe structure and problems associated therewith.

In the conventional decompression heat-insulating pipe structure 100 for low-temperature applications, such as water bottles, as shown in FIG. 7, open ends of an inner tube 101 and an outer tube 102 forming a double-tube structure are joined together by welding. However, when such a technique is attempted to be used for high-temperature applications, such as heating furnaces, the dimensions of the inner tube 101 increase significantly due to thermal expansion. Therefore, large distortion stress acts on the joined part 103 between the inner tube 101 and the outer tube 102, and so the joined part 103 may be become damaged.

As the conventional decompression heat-insulating pipe structure 110, as shown in FIG. 8, there has been proposed a structure in which an elastic seal member 113 is radially sandwiched between ends of an inner tube 111 and an outer tube 112 for sealing (see JP 2003-314785 A).

FIG. 8(1) is a view showing a state before and after the inner tube 111 thermally expands radially, FIG. 8(2) is a view showing a state before and after the inner tube 111 thermally expands axially, FIG. 8(3) is a view showing a state in which a space 114 between the inner tube 111 and the outer tube 112 is radially too wide, and FIG. 8(4) shows a state in which the space 114 between the inner tube 111 and the outer tube 112 is radially too narrow.

For example, in the structure shown in FIG. 8(1), the amount of the thermal expansion of the inner tube 111 in the radial direction is absorbed only by the compressive deformation of the elastic seal member 113. Therefore, the elastic seal member 113 is radially compressed too much due to the thermal expansion and an end of the elastic seal member 113 deforms into a barrel shape, and so, the elastic seal member 113 may become damaged such that it cracks. Meanwhile, in the structure shown in FIG. 8(2), the amount of thermal expansion of the inner tube 111 in the axial direction is absorbed only by the deformation of the elastic seal member 113 in the shear direction. Therefore, the elastic seal member 113 is pulsed axially too much due to the thermal expansion, and so the elastic seal member 113 may become damaged such that it is torn off.

Meanwhile, with a method of forming the inner tube 111 and the outer tube 112 by deforming iron plates into tubular shapes, for example, it would be impossible to increase the dimensional accuracy in the radial direction. Therefore, when the radial dimension of the inner tube is smaller than the standard dimension, a gap is formed between the inner tube 111 and the elastic seal member 113 and between the outer tube 112 and the elastic seal member 113 as shown in FIG. 8(3), and so the space 114 cannot be decompressed. Meanwhile, when the radial dimension of the inner tube is larger than the standard dimension, the space 114 between the inner tube 111 and the outer tube 112 becomes too narrow as shown in FIG. 8(4). Therefore, the elastic seal member 113 cannot be attached thereto and the structure cannot be easily assembled.

In contrast, in the decompression heat-insulating pipe structure 1A of this embodiment, the first elastic seal member 11 and the second elastic seal member 12 are not sandwiched in the radial direction in which the dimensional accuracy is low unlike in the aforementioned conventional techniques, but are sandwiched in the axial direction in which the dimensional accuracy is high. Therefore, decompressing a space between the outer tube 2 and the inner tube 3 can compress the first elastic seal member 11 and the second elastic seal member 12 in the axial direction and can seal a space between the first flange 21 and the third flange 31 as well as a space between the second flange 22 and the fourth flange 32. Therefore, the space 4 between the outer tube 2 and the inner tube 3 can be decompressed reliably, and so the desired heat-insulating performance can be achieved. Further, the structure can be easily assembled simply by inserting the inner tube 3 into the outer tube 2, which facilitates the assembly operation.

Second Embodiment

Next, a second embodiment of the present disclosure will be described in detail with reference to the drawings. It should be noted that the same components as those in the first embodiment are denoted by the same reference numerals and detailed description will be omitted.

FIG. 4A is a cross-sectional view showing a state before the internal space of an inner tube of a decompression heat-insulating pipe structure in accordance with the second embodiment is heated. FIG. 4B is a cross-sectional view showing a state in which the internal space of the inner tube of the decompression heat-insulating pipe structure in accordance with the second embodiment is heated.

A decompression heat-insulating pipe structure 1B in this embodiment is characterized in that an outer tube 2 is formed with a first outer tube 2A and a second outer tube 2B so that the axial length of the outer tube 2 is made adjustable.

The decompression heat-insulating pipe structure 1B has the outer tube 2 and an inner tube 3. The outer tube 2 has the first outer tube 2A at its axially one end and has the second outer tube 2B, which is fitted to the first outer tube 2A, at its axially other end. Each of the first outer tube 2A and the second outer tube 2B has a cylindrical tubular shape having a constant diameter and extending in the axial direction. The first outer tube 2A has a larger diameter than the second outer tube 2B. In addition, an O-ring 7, which seals a space between the first outer tube 2A and the second outer tube 2B and supports the first outer tube 2A and the second outer tube 2B such that they are axially slidable with respect to each other, is disposed between the first outer tube 2A and the second outer tube 2B.

The first outer tube 2A has a first long-tube portion 53 at its axially one end and has a first short-tube portion 54, which has higher dimensional accuracy in the radial direction than the first long-tube portion 53, at axially one end of the first long-tube portion 53. The first long-tube portion 53 is formed by bending an iron plate, which is a metal flat plate member with a constant thickness, using a working machine, such as a roll bender, and deforming the plate into a tubular shape. Therefore, the dimensional accuracy in the radial direction of the first long-tube portion 53 is lower than that of a tube formed through mechanical machining.

The first long-tube portion 53 has a first flange 51 extending radially inward at its axially one end. The first flange 51 has been formed by cutting an iron plate into a circular shape and is joined to the axially one end of the first long-tube portion 53 by welding.

The first short-tube portion 54 has almost the same diameter as the first long-tube portion 53, is axially shorter than the first long-tube portion 53, and has a cylindrical tubular shape with a thicker wall than that of the first long-tube portion 53. The first short-tube portion 54 is disposed coaxially with the first long-tube portion 53 at the axially other end thereof, and is joined to the axially other end of the first long-tube portion 53 by welding or the like, so as to be integrally formed therewith. The first short-tube portion 54 is formed through mechanical machining, such as cutting, and so has higher dimensional accuracy in the radial direction than the first long-tube portion 53.

The second outer tube 2B has a second long-tube portion 56 at its axially one end, and has a second short-tube portion 55, which has higher dimensional accuracy in the radial direction than the second long-tube portion 56, at axially one end of the second long-tube portion 56. The second long-tube portion 56 is formed by bending an iron plate, which is a metal flat plate member with a constant thickness, using a working machine, such as a roll bender, and deforming the plate into a tubular shape, as with the first long-tube portion 53 of the first outer tube 2A. Therefore, the dimensional accuracy in the radial direction of the second long-tube portion 56 is lower than that of a tube formed through mechanical machining.

The second long-tube portion 56 has a second flange 52 extending radially inward at its axially other end. The second flange 52 has been formed by cutting an iron plate into a circular shape and is joined to the axially other end of the second long-tube portion 56 by welding.

The second short-tube portion 55 has almost the same diameter as the second long-tube portion 56, is axially shorter than the second long-tube portion 56, and has a cylindrical tubular shape with a thicker wall than that of the second long-tube portion 56. The second short-tube portion 55 is disposed coaxially with the second long-tube portion 56 at axially one end thereof, and is joined to the axially one end of the second long-tube portion 56 by welding or the like, so as to be integrally formed therewith. The second short-tube portion 55 is formed through mechanical machining, such as cutting, and so has higher dimensional accuracy in the radial direction than the second long-tube portion 56.

The outside diameter of the second short-tube portion 55 is set such that it allows the outer peripheral surface of the second short-tube portion 55 to be opposed to the inner peripheral surface of the first short-tube portion 54 with a predetermined gap therebetween in a state in which the second short-tube portion 55 is inserted in the first short-tube portion 54. The second short-tube portion 55 has a recessed groove 55a for holding an O-ring 7 therein.

The O-ring 7 is held in the recessed groove 55a, and supports the first short-tube portion 54 and the second short-tube portion 55 such that they are axially slidable with respect to each other. Therefore, the first outer tube 2A and the second outer tube 2B are moved relative to each other in the axial direction, and the outer tube 2 is allowed to elongate and contract axially, that is, the axial length of the outer tube 2 is made adjustable. Further, since the O-ring 7 is interposed between the first short-tube portion 54 and the second short-tube portion 55 each having high dimensional accuracy in the radial direction, the space between the first short-tube portion 54 and the second short-tube portion 55 can be sealed reliably.

The first long-tube portion 53 of the first outer tube 2A and the second long-tube portion 56 of the second outer tube 2B have almost equal axial lengths, and in a state in which the outer tube 2 is formed with the first outer tube 2A and the second outer tube 2B fitted together, the first short-tube portion 54 and the second short-tube portion 55 are adapted to be located at the axially central position of the outer tube 2. It should be noted that the axially central position of the outer tube 2 is not limited to the position at which the distance to one end of the outer tube 2 is totally equal to the distance to the other end thereof, and may be approximately the central position with some margin included.

The inner tube 3 has a cylindrical tubular shape having a constant diameter and extending in the axial direction. The diameter of the inner tube 3 is smaller than that of the outer tube 2 and is large enough to form a predetermined space 4 between the inner tube 3 and the outer tube 2 in a state in which the inner tube 3 is inserted in the outer tube 2. The inner tube 3 is formed by bending an iron plate using a working machine, such as a roll bender, and deforming the plate into a tubular shape, as with the outer tube 2. Therefore, the dimensional accuracy in the radial direction of the inner tube 3 is lower than that of a tube formed through mechanical machining.

The inner tube 3 has a third flange 61 at its axially one end. The third flange 61 extends radially from the axially one end of the inner tube 3 and is opposed to the first flange 51 at an axially inward position of the first flange 51. In addition, the inner tube 3 has a fourth flange 62 at its axially other end. The fourth flange 62 extends radially from the axially other end of the inner tube 3 and is opposed to the second flange 52 at an axially inward position of the second flange 52. The third flange 61 and the fourth flange 62 have been formed by cutting iron plates into circular shapes and are joined to the respective opposite ends of the inner tube 3 by welding.

In this embodiment, each of the third flange 61 and the fourth flange 62 extends radially outward. Therefore, a large space 4 is secured between the outer tube 2 and the inner tube 3 and high heat-insulating performance can be achieved. It should be noted that each of the third flange 61 and the fourth flange 62 may be configured to extend radially inward. In such a case, a large internal space of the inner tube 3 can be secured, and so the structure can be used for larger workpieces.

The decompression heat-insulating pipe structure 1B is assembled by attaching the first outer tube 2A to the inner tube 3 at its axially one side, attaching the second outer tube 2B to the inner tube 3 at its axially other side, and then inserting the second short-tube portion 55 of the second outer tube 2B into the first short-tube portion 54 of the first outer tube 2A. Accordingly, the third flange 61 is opposed to the first flange 51 at an axially inward position of the first flange 51, and the fourth flange 62 is opposed to the second flange 52 at an axially inward position of the second flange 52.

The third flange 61 and the fourth flange 62 of the inner tube 3 have the first elastic seal member 11 and the second elastic seal member 12 securely bonded thereto in advance, respectively. Attaching the first outer tube 2A to the inner tube 3 allows the first elastic seal member 11 to abut the first flange 51 of the first outer tube 2A to be securely bonded thereto, and attaching the second outer tube 2B to the inner tube 3 allows the second elastic seal member 12 to abut the second flange 52 of the second outer tube 2B to be securely bonded thereto.

Therefore, an assembled state is obtained in which the first elastic seal member 11 is disposed between the first flange 51 and the third flange 61 so as to be sandwiched from axially opposite sides, and the second elastic seal member 12 is disposed between the second flange 52 and the fourth flange 62 so as to be sandwiched from axially opposite sides (see FIG. 4A).

The decompression heat-insulating pipe structure 1B can be assembled by inserting the inner tube 3 into the outer tube 2 even when the dimensional accuracy in the radial direction of the inner tube 3 and the outer tube 2 is not high, and therefore, the first elastic seal member 11 and the second elastic seal member 12 can be disposed reliably between the first flange 51 and the third flange 61 and between the second flange 52 and the fourth flange 62, respectively, so as to be sandwiched therebetween. The decompression heat-insulating pipe structure 1B can be easily assembled without the need for welding when assembled. Therefore, high assembling performance can be obtained.

In the decompression heat-insulating pipe structure 1B, the internal space of the inner tube 3 is heated to heat a workpiece. When the internal space of the inner tube 3 is heated, the radial and axial dimensions of the inner tube 3 increase due to thermal expansion. In addition, the space 4 between the outer tube 2 and the inner tube 3 is decompressed to increase the heat-insulating performance. As the space 4 is decompressed, the outer tube 2 and the inner tube 3 are urged in the directions of relatively approaching each other. Therefore, the first elastic seal member 11 is compressed axially between the first flange 51 and the third flange 61, and the second elastic seal member 12 is compressed axially between the second flange 52 and the fourth flange 62.

In the decompression heat-insulating pipe structure 1B, when the space 4 between the outer tube 2 and the inner tube 3 is decompressed, the first elastic seal member 11 and the second elastic seal member 12 can be compressed axially and tightly attached to the first flange 51 and the third flange 61 and to the second flange 52 and the fourth flange 62, respectively. Therefore, a high sealing property can be obtained even when the dimensional accuracy in the radial direction of the outer tube 2 and the inner tube 3 is not high. Therefore, the space 4 between the outer tube 2 and the inner tube 3 can be decompressed reliably, and so high heat-insulating performance can be obtained.

The first elastic seal member 11 and the second elastic seal member 12 deform in the shear direction when the radial dimension of the inner tube 3 increases due to thermal expansion. However, the sealing property will not be lost since the first elastic seal member 11 and the second elastic seal member 12 are always tightly attached to the first flange 51 and the third flange 61 and to the second flange 52 and the fourth flange 62, respectively, due to the atmospheric pressure.

In the decompression heat-insulating pipe structure 1B, when the temperature of the inner tube 3 increases and the inner tube 3 elongates axially due to thermal expansion, the first outer tube 2A and the second outer tube 2B are pushed in the directions to be away from each other along the axial direction, and so the outer tube 2 extends. Therefore, damage to the first elastic seal member 11 and the second elastic seal member 12 due to excessive compression can be prevented. Meanwhile, when the temperature of the inner tube 3 decreases and the inner tube 3 contracts axially due to thermal shrinkage, the first outer tube 2A and the second outer tube 2B move in the directions of approaching each other along the axial direction correspondingly, and so the outer tube 2 contracts. Therefore, the sealed state with the first elastic seal member 11 and the second elastic seal member 12 is always kept, and so a high sealing property can be always maintained.

In the decompression heat-insulating pipe structure 1B, the first short-tube portion 54 and the second short-tube portion 55 are disposed at the axially central position of the outer tube 2. The axially central position of the outer tube 2 is the most distant position from the axially opposite ends of the outer tube 2 to which heat from the inner tube 3 is easily transferred, and so is a position that is least likely to be influenced by the heat of the inner tube 3. Therefore, disposing the first short-tube portion 54 and the second short-tube portion 55 at the axial central position can suppress a temperature rise of the first short-tube portion 54, the second short-tube portion 55, the O-ring 7, and so can suppress deformation thereof due to thermal expansion. Therefore, the sealing property between the first outer tube 2A and the second outer tube 2B can be kept high.

Figure 5:
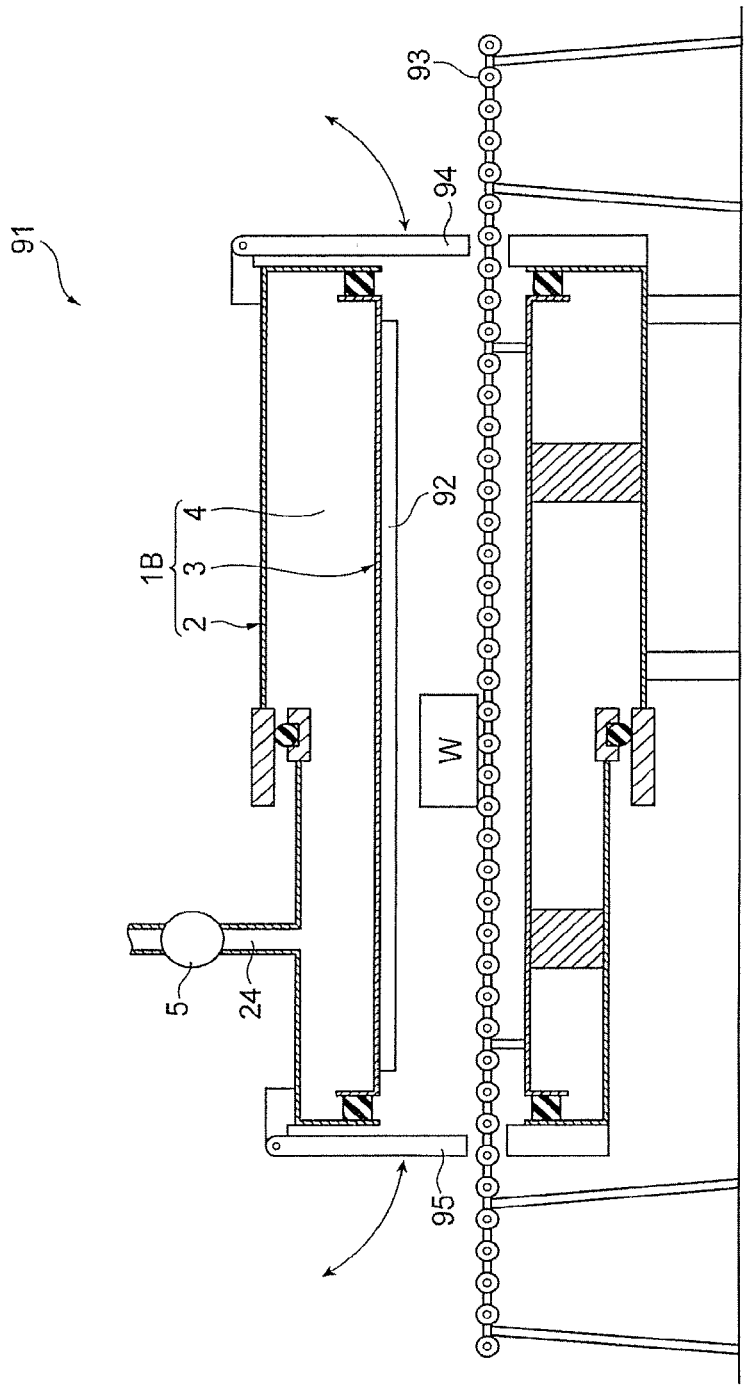
FIG. 5 is a configuration view of a heating furnace to which the decompression heat-insulating pipe structure in accordance with the second embodiment is applied.

FIG. 5 is a configuration view of a heating furnace to which the decompression heat-insulating pipe structure in accordance with the second embodiment is applied. The decompression heat-insulating pipe structure 1B is used for, for example, a heating furnace 91 in which a workpiece W is passed through the internal space of the inner tube 3 kept in a high-temperature state so as to be heated. The heating furnace 91 includes a heater 92 for heating the internal space of the inner tube 3, a conveying roller 93 that conveys the workpiece W to pass it through the internal space of the inner tube 3, and a pair of opening/closing doors 94 and 95 that open and close an inlet that is axially one end of the inner tube 3 and an outlet that is the axially other end of the inner tube 3. In the heating furnace 91, the opening/closing door 94 on the inlet side is opened to convey the workpiece W into the internal space of the inner tube 3, and the workpiece W is heated by the heater 92 in the internal space of the inner tube 3. Then, the opening/closing door 95 on the outlet side is opened so that the heated workpiece W is taken out of the internal space of the inner tube 3.

Third Embodiment

Next, a third embodiment of the present disclosure will be described in detail with reference to the drawings. It should be noted that the same components as those in the first embodiment are denoted by the same reference numerals and detailed description will be omitted.

Figure 6:
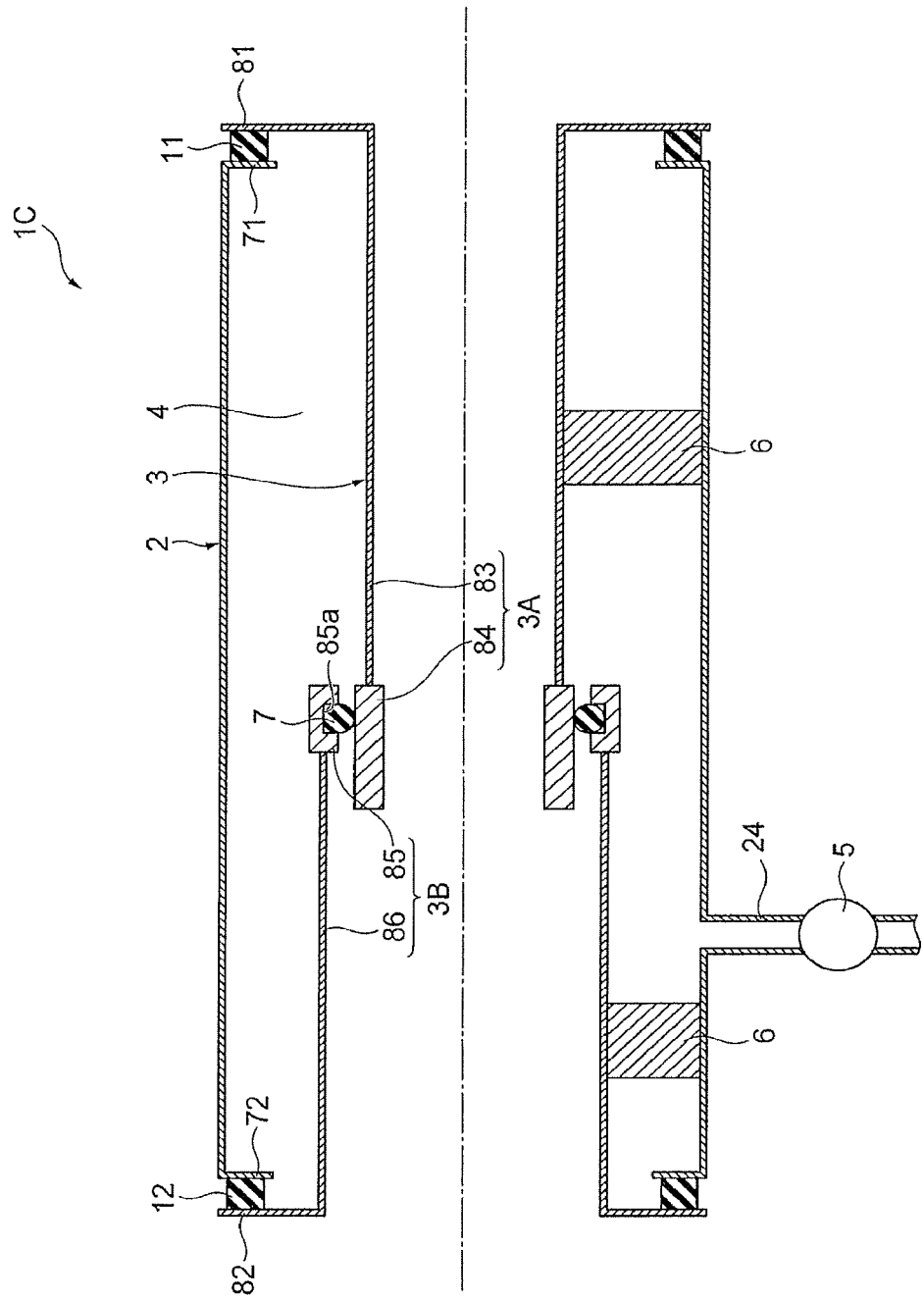
FIG. 6 is a cross-sectional view showing an exemplary configuration of a decompression heat-insulating pipe structure in accordance with a third embodiment.

FIG. 6 is a cross-sectional view showing an exemplary configuration of a decompression heat-insulating pipe structure in accordance with the third embodiment.

This embodiment is characterized in that an inner tube 3 of a decompression heat-insulating pipe structure 1C is formed with a first inner tube 3A and a second inner tube 3B so that the axial length of the inner tube 3 is made adjustable.

The decompression heat-insulating pipe structure 1C has an outer tube 2 and the inner tube 3. The outer tube 2 has a first flange 71 extending radially inward from its axially one end, and has a second flange 72 extending radially inward from its axially other end.

The inner tube 3 has a first inner tube 3A at its axially one end and has a second inner tube 3B, which is fitted to the first inner tube 3A, at its axially other end. Each of the first inner tube 3A and the second inner tube 3B has a cylindrical tubular shape having a constant diameter and extending in the axial direction. The first inner tube 3A has a larger diameter than the second inner tube 3B. In addition, an O-ring 7, which seals a space between the first inner tube 3A and the second inner tube 3B and supports the first inner tube 3A and the second inner tube 3B such that they are axially slidable with respect to each other, is disposed between the first inner tube 3A and the second inner tube 3B.

The first inner tube 3A has a first long-tube portion 83 at its axially one end and has a first short-tube portion 84, which has higher dimensional accuracy in the radial direction than the first long-tube portion 83, at axially one end of the first long-tube portion 83. The first long-tube portion 83 is formed by bending an iron plate, which is a metal flat plate member with a constant thickness, using a working machine, such as a roll bender, and deforming the plate into a tubular shape. Therefore, the dimensional accuracy in the radial direction of the first long-tube portion 83 is lower than that of a tube formed through mechanical machining.

The first long-tube portion 83 has a third flange 81 extending radially inward at its axially one end. The third flange 81 is opposed to the first flange 71 of the outer tube 2 at an axially outward position of the first flange 71.

The first short-tube portion 84 has almost the same diameter as that of the first long-tube portion 83, is axially shorter than the first long-tube portion 83, and has a cylindrical tubular shape with a thicker wall than that of the first long-tube portion 83. The first short-tube portion 84 is disposed coaxially with the first long-tube portion 83 at the axially other end thereof, and is joined to the axially other end of the first long-tube portion 83 by welding or the like so as to be integrally formed therewith. The first short-tube portion 84 is formed through mechanical machining, such as cutting, and so has higher dimensional accuracy in the radial direction than the first long-tube portion 83.

The second inner tube 3B has a second long-tube portion 86 at its axially one end and has a second short-tube portion 85, which has higher dimensional accuracy in the radial direction than the second long-tube portion 86, at axially one end of the second long-tube portion 86. The second long-tube portion 86 is formed by bending an iron plate, which is a metal flat plate member with a constant thickness, using a working machine, such as a roll bender, and deforming the plate into a tubular shape, as with the first long-tube portion 83 of the first inner tube 3A. Therefore, the dimensional accuracy in the radial direction of the second long-tube portion 86 is lower than that of a tube formed through mechanical machining.

The second long-tube portion 86 has a fourth flange 82 extending radially inward at its axially other end. The fourth flange 82 is opposed to the second flange 72 at an axially outward position of the second flange 72 of the outer tube 2.

The second short-tube portion 85 has almost the same diameter as the second long-tube portion 86, is axially shorter than the second long-tube portion 86, and has a cylindrical tubular shape with a thicker wall than that of the second long-tube portion 86. The second short-tube portion 85 is disposed coaxially with the second long-tube portion 86 at axially one end thereof, and is joined to the axially one end of the second long-tube portion 86 by welding or the like so as to be integrally formed therewith. The second short-tube portion 85 is formed through mechanical machining, such as cutting, and so has higher dimensional accuracy in the radial direction than the second long-tube portion 86.

The outside diameter of the second short-tube portion 85 is set such that it allows the outer peripheral surface of the second short-tube portion 85 to be opposed to the inner peripheral surface of the first short-tube portion 84 with a predetermined gap therebetween in a state in which the second short-tube portion 85 is inserted in the first short-tube portion 84. The second short-tube portion 85 has a recessed groove 8a for holding an O-ring 7 therein.

The O-ring 7 is held in the recessed groove 85a, and supports the first short-tube portion 84 and the second short-tube portion 85 such that they are axially slidable with respect to each other. Therefore, the first inner tube 3A and the second inner tube 3B are moved relative to each other in the axial direction, and the inner tube 3 is allowed to elongate and contract axially, that is, the axial length of the inner tube 3 is made adjustable. Further, since the O-ring 7 is interposed between the first short-tube portion 84 and the second short-tube portion 85 each having high dimensional accuracy in the radial direction, the space between the first short-tube portion 84 and the second short-tube portion 85 can be sealed reliably.

In the decompression heat-insulating pipe structure 1C, when the space 4 between the outer tube 2 and the inner tube 3 is decompressed, the first inner tube 3A and the second inner tube 3B can be urged in the directions to contract along the axial direction, and so, the first elastic seal member 11 and the second elastic seal member 12 can be compressed axially and tightly attached to the first flange 71 and the third flange 81 and to the second flange 72 and the fourth flange 82, respectively. Therefore, even when the dimensional accuracy in the radial direction of the outer tube 2 and the inner tube 3 is not high, a high sealing property can be obtained. Therefore, the space 4 between the outer tube 2 and the inner tube 3 can be decompressed reliably, and so high heat-insulating performance can be obtained.

In the decompression heat-insulating pipe structure 1C, the first short-tube portion 84 and the second short-tube portion 85 are provided on the inner tube 3. Therefore, there is a possibility that the inner tube 3 may expand radially due to thermal expansion and the sealing property will be lost. Therefore, from the aspect of the sealing property, the second embodiment in which the first short-tube portion and the second short-tube portion are provided on the outer tube 2 is more preferable.

Although the embodiments of the present disclosure have been described in detail, the present disclosure is not limited thereto, and various design changes are possible within the spirit and scope of the present disclosure described in the appended claims. For example, although the aforementioned embodiments have been described in detail to clearly illustrate the present disclosure, the present disclosure need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

DESCRIPTION OF SYMBOLS 1A, 1B, 1C Decompression heat-insulating pipe structure
2 Outer tube
2A First outer tube
2B Second outer tube
3 Inner tube
3A First inner tube
3B Second inner tube
4 Space
5 Vacuum pump
11 First elastic seal member
12 Second elastic seal member
21, 51, 71 First flange
22, 52, 72 Second flange
31 61, 81 Third flange
32, 62, 82 Fourth flange
53, 83 First long-tube portion
54, 84 First short-tube portion
55, 85 Second short-tube portion
56, 86 Second long-tube portion

What is claimed is:

1. A decompression heat-insulating pipe structure comprising:
    an outer tube that includes a first flange and a second flange, the first flange extending radially inward from an axially one end of the outer tube, and the second flange extending radially outward from the axially other end of the outer tube;
    an inner tube that includes a third flange and a fourth flange, the third flange extending radially inward from an axially one end of the inner tube and being opposed to the first flange at an axially inward position of the first flange, and the fourth flange extending radially outward from the axially other end of the inner tube and being opposed to the second flange at an axially outward position of the second flange; and
    an elastic seal member disposed between ends of the inner tube and the outer tube to seal a space between the inner tube and the outer tube so that the space is decompressed, the elastic seal member includes a first elastic seal member and a second elastic seal member, the first elastic seal member being disposed between and in direct contact with each of the first flange and the third flange, and the second elastic seal member being disposed between and in direct contact with each of the second flange and the fourth flange.

2. The decompression heat-insulating pipe structure according to claim 1, wherein at least one of the inner tube or the outer tube includes bellows, the bellows being configured to elongate or contract axially.

* * * * *